(12) United States Patent
Miyamoto et al.

(10) Patent No.: US 12,279,012 B2
(45) Date of Patent: Apr. 15, 2025

(54) INFORMATION PROCESSING SYSTEM, INFORMATION PROCESSING APPARATUS, INFORMATION PROCESSING METHOD, AND NON-TRANSITORY STORAGE MEDIUM

(71) Applicant: NINTENDO CO., LTD., Kyoto (JP)

(72) Inventors: Shigeru Miyamoto, Kyoto (JP); Takeshi Ito, Kyoto (JP); Norio Asakura, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 60 days.

(21) Appl. No.: 18/320,632

(22) Filed: May 19, 2023

(65) Prior Publication Data

US 2023/0421842 A1 Dec. 28, 2023

(30) Foreign Application Priority Data

Jun. 22, 2022 (JP) .................. 2022-100596

(51) Int. Cl.
*H04N 21/442* (2011.01)
*H04N 21/462* (2011.01)
*H04N 21/482* (2011.01)

(52) U.S. Cl.
CPC ..... *H04N 21/44204* (2013.01); *H04N 21/462* (2013.01); *H04N 21/482* (2013.01)

(58) Field of Classification Search
CPC .......... H04N 21/44204; H04N 21/462; H04N 21/482
See application file for complete search history.

(56) References Cited

U.S. PATENT DOCUMENTS

2016/0088352 A1* 3/2016 Agrawal ............ H04N 21/4667
2022/0272425 A1* 8/2022 Puniyani ............ H04N 21/8549

FOREIGN PATENT DOCUMENTS

JP 2004247832 A 9/2004

* cited by examiner

*Primary Examiner* — Anthony Bantamoi
(74) *Attorney, Agent, or Firm* — Nixon & Vanderhye P.C.

(57) ABSTRACT

An information processing system 1 comprises: a presentation unit 32 for presenting display images relating to a plurality of kinds of content identification information to a user; an acquisition unit 33 for acquiring content identification information chosen by the user from among the content identification information presented to the user; a content determination unit 13 for determining playback content corresponding to the content identification information chosen by the user; a playback unit 34 for playing the playback content; and a flag setting unit 14 for, in response to the playback content having been played, associating a Viewed flag indicating that the relevant playback content has been played with the user's identification information. The content determination unit 13 determines the playback content corresponding to the content identification information chosen by the user in such a way that the playback content varies in detail depending on the Viewed flag.

20 Claims, 16 Drawing Sheets

| Playback content | Conditions |
|---|---|
| A-9a | There is no Viewed flag |
| A-9b | There is one Viewed flag |
| A-9c | There are two Viewed flags |
| A-9d | There are three or more Viewed flags |
| ⋮ | ⋮ |

| Playback content | Conditions |
|---|---|
| A-4a | There is no Viewed flag relating to A-3 |
| A-4b | There is a Viewed flag relating to A-3 |
| ⋮ | ⋮ |

*FIG. 5B*

INFORMATION PROCESSING SYSTEM, INFORMATION PROCESSING APPARATUS, INFORMATION PROCESSING METHOD, AND NON-TRANSITORY STORAGE MEDIUM

CROSS REFERENCE TO RELATED APPLICATION

This nonprovisional application is based on Japanese Patent Application No. 2022-100596 filed with the Japan Patent Office on Jun. 22, 2022, the entire contents of which are hereby incorporated by reference.

FIELD

The present disclosure relates to an information processing system for delivering content.

BACKGROUND AND SUMMARY

Information processing systems for delivering content to users' terminals are conventionally known. When a plurality of episodes are delivered, such as in the case of anime, viewing in a prescribed order is generally assumed.

In the field of game technology, in contrast, there is also known a content delivery technique that assumes viewing a plurality of pieces of video content in any order. Japanese Patent Laid-Open Application No. 2004-247832 describes a video delivery system that realizes a video content streaming delivery service via a network.

The details of content to be delivered by the above-mentioned conventional content delivery method would be predetermined. For example, if content is specified, such as, by the episode number of an anime series, its details would not vary depending on conditions such as the timing of receiving the delivery, and content with identical details would be provided.

A purpose of the disclosure made in view of the above-mentioned background is to provide content by means of a new method.

Configuration 1

Configuration 1 is an information processing system comprising: a processor and a memory coupled thereto, the processor being configured to control the information processing system to at least: presenting display images relating to a plurality of kinds of content identification information to a user; acquiring content identification information associated with a display image chosen by the user from among the display images presented to the user; determining playback content corresponding to the acquired content identification information; playing the playback content; and in response to the playback content having been played, associating a Viewed flag indicating that the relevant playback content has been played with the user's identification information, wherein determining the playback content corresponding to the acquired content identification information in such a way that the playback content varies in detail depending on the Viewed flag.

Since this configuration allows the playback content corresponding to the content identification information chosen by the user to be determined depending on the Viewed flag, the playback content can be changed based on the user's viewing history. The Viewed flag here is a flag indicating that the playback content has been played. This configuration therefore allows a viewing history of the playback content corresponding to the content identification information to affect the determination of playback content corresponding to another piece of content identification information. Accordingly, starting to choose from any of the kinds of content identification information can affect the determination of playback content for content identification information chosen later. Note that the determination of the playback content may include any one of the following methods: generating the playback content each time it is played; rendering the playback content in real time; and determining by choosing one of a plurality of pieces of playback content prepared in advance. The processor may be configured to control the information processing system to determining the content by using any one or more of the above methods.

Configuration 2

Configuration 2 is according to above-described Configuration 1, wherein determining, as the playback content, content generated by combining a template to be used as a form of the playback content and a compositing material to be composited to the relevant template.

Configuration 3

Configuration 3 is according to above-described Configuration 2, wherein the compositing material may include at least one of a sound, a moving image, and an image.

Configuration 4

Configuration 4 is according to any of above-described Configurations 1 to 3, where determining, as the playback content, content generated in such a way that the playback content varies in detail depending on at least the Viewed flag associated with the user's identification information.

Configuration 5

Configuration 5 is according to above-described Configuration 1, wherein determining the playback content by drawing details to be played in real time depending on at least the Viewed flag associated with the user's identification information.

Configuration 6

Configuration 6 is according to above-described Configuration 1, wherein determining the playback content corresponding to the content identification information associated with the display image chosen by the user, by choosing from among candidates for the playback content depending on at least the Viewed flag associated with the user's identification information.

Configuration 7

Configuration 7 is according to any of above-described Configurations 1 to 6, wherein determining the playback content in such a way that the playback content varies in detail depending on at least the number of Viewed flags associated with the user's identification information.

Configuration 8

Configuration 8 is according to any of above-described Configurations 1 to 7, wherein determining the playback content in such a way that the playback content varies in detail based on at least whether the Viewed flag indicating that the playback content associated with the content identification information that is predetermined and specified has been played is associated with the user's identification information or not.

Configuration 9

Configuration 9 is according to above-described Configuration 8, wherein determining the playback content in such a way that a character appearing in the playback content is changed based on at least whether the Viewed flag indicating that the playback content associated with the content identification information that is predetermined and specified has been played is associated with the user's identification information or not.

Configuration 10

Configuration 10 is according to any of above-described Configurations 8 to 9, wherein determining the playback content in such a way that an item object appearing in the playback content is changed based on at least whether the Viewed flag indicating that the playback content associated with the content identification information that is predetermined and specified has been played is associated with the user's identification information or not.

Configuration 11

Configuration 11 is according to any of above-described Configurations 1 to 10, wherein determining the playback content in such a way that a scenario varies depending on at least the Viewed flag associated with the user's identification information.

Configuration 12

Configuration 12 is according to any of above-described Configurations 1 to 11, wherein associating the Viewed flag with the user's identification information in response to the playback content having started to be played.

Configuration 13

Configuration 13 is according to any of above-described Configurations 1 to 12, wherein associating the Viewed flag with the user's identification information if a playback condition to be satisfied when the playback content has been played up to a prescribed point is satisfied.

Configuration 14

Configuration 14 is according to above-described Configuration 13, wherein the playback condition may be that the playback content has been played up to the playback content's 50% point.

Configuration 15

Configuration 15 is according to above-described Configuration 13, wherein the playback condition may be that the playback content has been played up to the playback content's end point.

Configuration 16

Configuration 16 is according to any of above-described Configurations 1 to 15, the processor being further configured to control the information processing system to calculating time elapsed from when the Viewed flag associated with the user's identification information is associated to when the content identification information is acquired, wherein determining the playback content depending on at least the elapsed time.

Configuration 17

Configuration 17 is according to any of above-described Configurations 1 to 16, wherein when any one of pieces of the playback content corresponding to the content identification information is played, counting up the number of playbacks of the content identification content and associating with the user's identification information.

Configuration 18

Configuration 18 is an information processing apparatus comprising: a processor and a memory coupled thereto, the processor being configured to control the information processing system to at least: sending data of display images relating to a plurality of kinds of content identification information to a user's user terminal; receiving content identification information associated with a display image chosen by the user from the user terminal; determining playback content corresponding to the content identification information determined based on the user's choice; sending data of the playback content to the user terminal; and in response to data indicating that the playback content has been played having been received from the user terminal, associating a Viewed flag indicating that the relevant playback content has been played with the user's identification information, wherein determining the playback content corresponding to the content identification information chosen by the user in such a way that the playback content varies in detail depending on the Viewed flag.

Configuration 19

Configuration 19 is a non-transitory storage medium on which an instruction for delivering content to a user terminal is recorded. The instruction stored in the non-transitory storage medium causes a computer to execute the steps of: sending data of display images relating to a plurality of kinds of content identification information to a user's user terminal; receiving content identification information associated with a display image chosen by the user from the user terminal; determining playback content corresponding to the content identification information chosen by the user; sending data of the playback content to the user terminal; and in response to data indicating that the playback content has been played having been received from the user terminal, associating a Viewed flag indicating that the relevant playback content has been played with the user's identification information, where, in the step of determining playback content, the playback content corresponding to the content identification information chosen by the user is determined in such a way that the playback content varies in detail depending on the Viewed flag.

Configuration 20

Configuration 20 is a method for delivering content from a server apparatus to a user terminal, the method being an information processing method comprising the steps of: the user terminal presenting display images relating to a plurality of kinds of content identification information to a user; the user terminal acquiring content identification information chosen by the user from among the content identification information presented to the user; the server apparatus determining playback content corresponding to the content identification information determined based on the user's choice; the user terminal playing the playback content; and the server apparatus, in response to the playback content having been played, associating a Viewed flag indicating that the relevant playback content has been played with the user's identification information, wherein, in the step of determining playback content, the playback content corresponding to the content identification information chosen by the user is determined in such a way that the playback content varies in detail depending on the Viewed flag.

Configuration 21

Configuration 21 is according to any of above-described Configurations 1 to 17, wherein presenting the display images in different display modes between pieces of content identification information whose Viewed flag is and is not associated with the user's identification information.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 5A shows an example of arrangement data.

FIG. 5B shows another example of arrangement data.

DETAILED DESCRIPTION OF NON-LIMITING EXAMPLE EMBODIMENTS

An information processing system of an embodiment of the disclosure will now be described with reference to the drawings. The embodiment described below is merely illustrative of ways to implement the disclosure, and does not limit the disclosure to the specific configurations described below. When the disclosure is to be implemented, any specific configuration may be appropriately adopted according to the mode of implementation.

Summary

Figure 1:
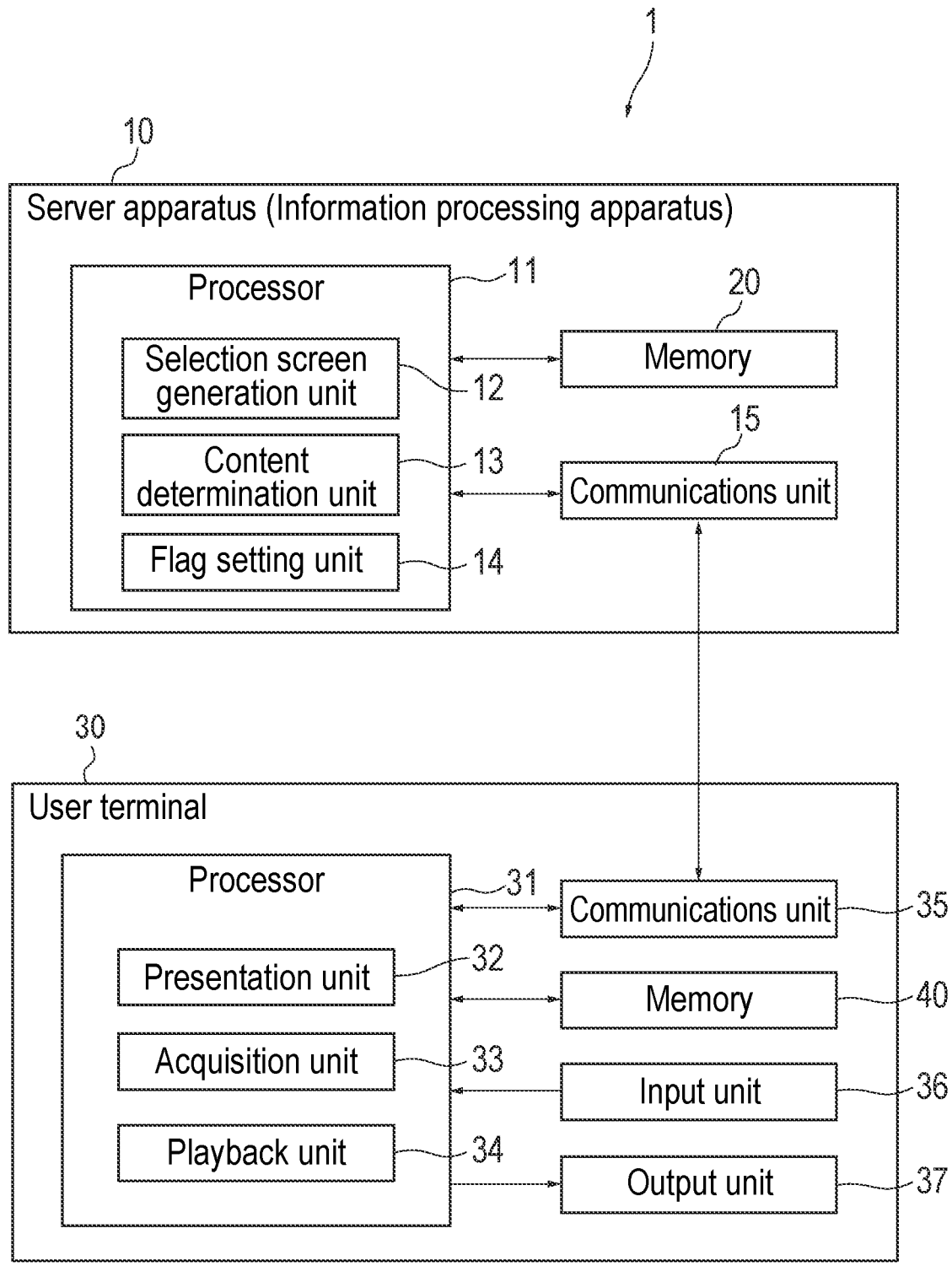
FIG. 1 shows a configuration of an information processing system of an embodiment.

FIG. 1 shows a configuration of an information processing system 1 of an embodiment. The information processing system 1 has a server apparatus 10 for delivering content, and a user terminal 30 for playing delivered content. Only one user terminal 30 is described in FIG. 1, but the information processing system 1 may include a plurality of user terminals 30 for receiving content delivery from the server apparatus 10.

To begin with, a summary of content delivery provided by the information processing system 1 of the embodiment will be described. The server apparatus 10 delivers a plurality of pieces of content related to one another to the user terminal 30. A plurality of pieces of content related to one another are a series of programs, anime, moving images provided by an RPG or other games, or the like. In the case of anime, for example, a plurality of episodes of the same anime are a plurality of pieces of content related to one another.

The information processing system 1 of the embodiment changes the details of content that it delivers depending on which content a user has viewed. This does not mean that it delivers different content depending on a viewing history, but means that it delivers the same content with changed details.

This will be explained by using the delivery of episode 9 of certain anime A as an example. The information processing system 1 of the embodiment delivers episode 9 with different details to, for example, a user who has viewed episode 7 and a user who has not. To cite an example of content with different details, if there is a character appearing in episode 7, a version of episode 9 where the character appears is delivered to a user who has viewed episode 7, and a version of episode 9 where the character does not appear is delivered to a user who has not viewed episode 7.

Terms used herein will be described here. "Content" is a unit of playback content (described later) identified by the same identification information. In the above example, "episode 9 of anime A" corresponds to "content." In contrast to this, "playback content" is a term referring to content itself to be played actually (e.g., a moving image). In the above example, "episode 9 of anime A to be delivered to a user who has viewed episode 7" and "episode 9 of anime A to be delivered to a user who has not viewed episode 7" each correspond to "playback content." That means, a plurality of pieces of "playback content" may be associated with the same "content" in the embodiment. Playing any one of the pieces of playback content will count as having viewed the corresponding content. In the above example, viewing either episode 9 for when episode 7 has been viewed or episode 9 for when episode 7 has not been viewed will count as having viewed the content titled episode 9.

Configuration of Information Processing System 1

Configurations of the server apparatus 10 and the user terminal 30 comprising the information processing system 1 will be described with reference to FIG. 1.

Configuration of Server Apparatus 10

The server apparatus 10 has a processor 11, a memory 20, and a communications unit 15. The processor 11 reads and executes a program stored in the memory 20, and thereby realizes the functions of a selection screen generation unit 12, a content determination unit 13, and a flag setting unit 14.

Figure 2:
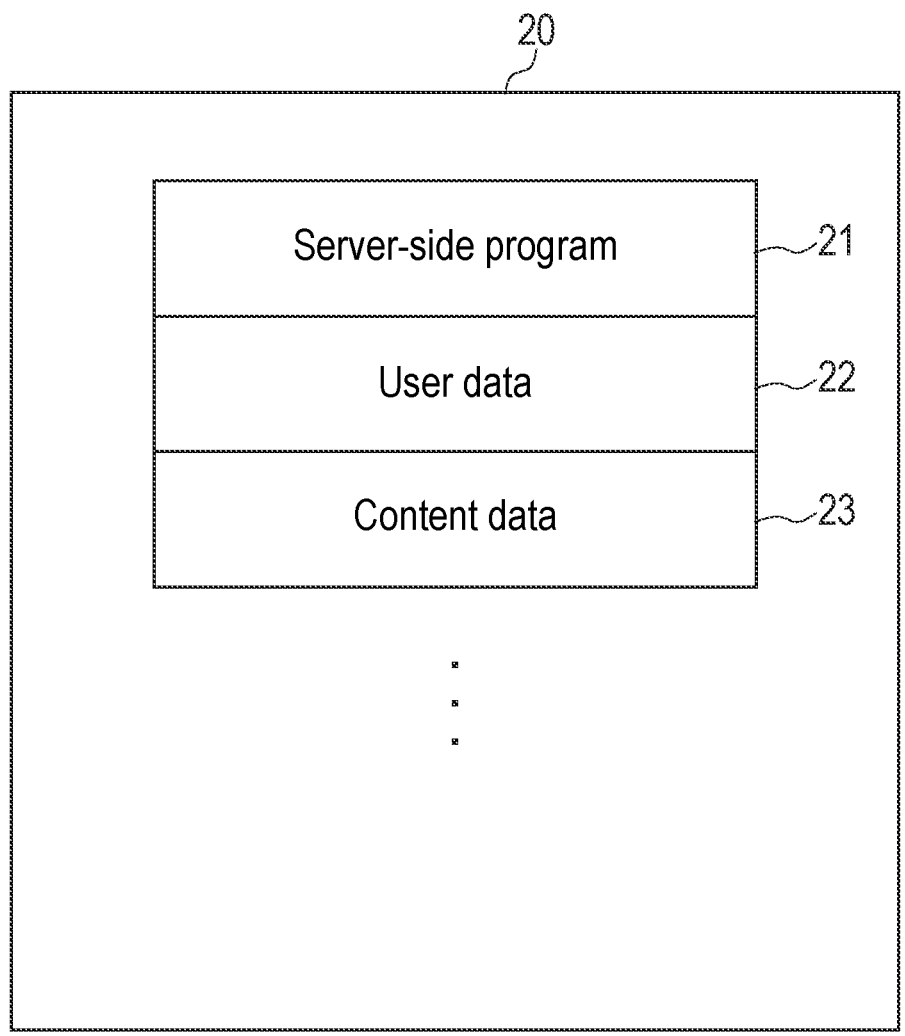
FIG. 2 is a memory map showing an example of various data stored in a memory of a server apparatus.

FIG. 2 is a memory map showing an example of various data stored in the memory 20 of the server apparatus 10. The memory 20 of the server apparatus 10 holds a server-side program 21, user data 22, content data 23, and the like.

The server-side program 21 is for carrying out content delivery in the embodiment. The program includes codes for performing the determination of playback content, a process of delivering playback content, a process of communicating with the user terminal 30, and the like.

Figure 3:
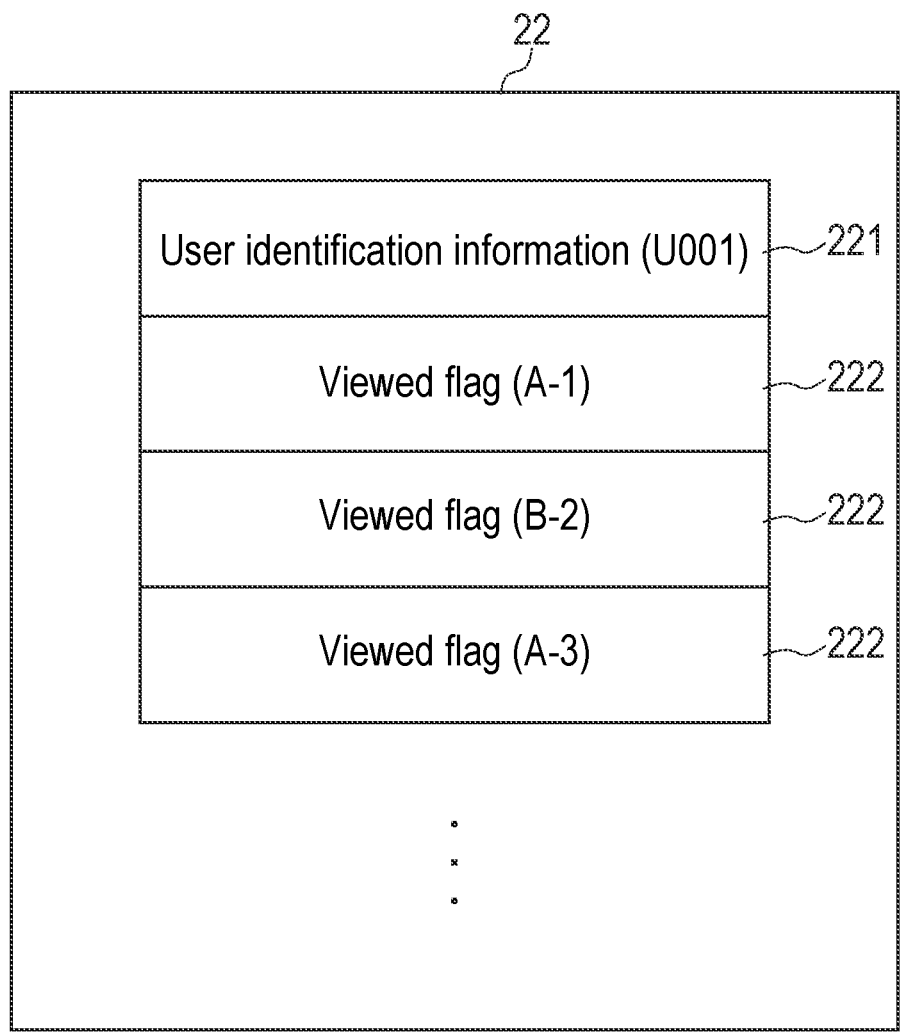
FIG. 3 shows an example of a data configuration of user data.

The user data 22 is for managing Viewed flags of a user. FIG. 3 shows an example of a data configuration of the user data 22. The user data 22 comprises a record containing items of user identification information 221 and Viewed flags 222. Viewed flags are items indicating which content has already been viewed by a user, and are variable items the number of which increases as the number of pieces of viewed content increases.

In FIG. 3, specific examples of data stored in the memory map are noted in brackets. The user identification information 221 is "U001" in the example shown in FIG. 3. Three Viewed flags 222 "A-1," "B-2," and "A-3" are associated with "U001." "A-1" indicates the first content of a series "A", and "A-3" indicates the third content of the series "A." "B-2" indicates the second content of a series "B." "A-1" and "A-3" are pieces of content related to each other in the same series, but are not related to "B-2" since it is of a different series from theirs. Though an example in which the user data 22 has only Viewed flags 222 is given in the embodiment, the user's attribute information, billing data, or other data may be stored in the user data 22.

Figure 4:
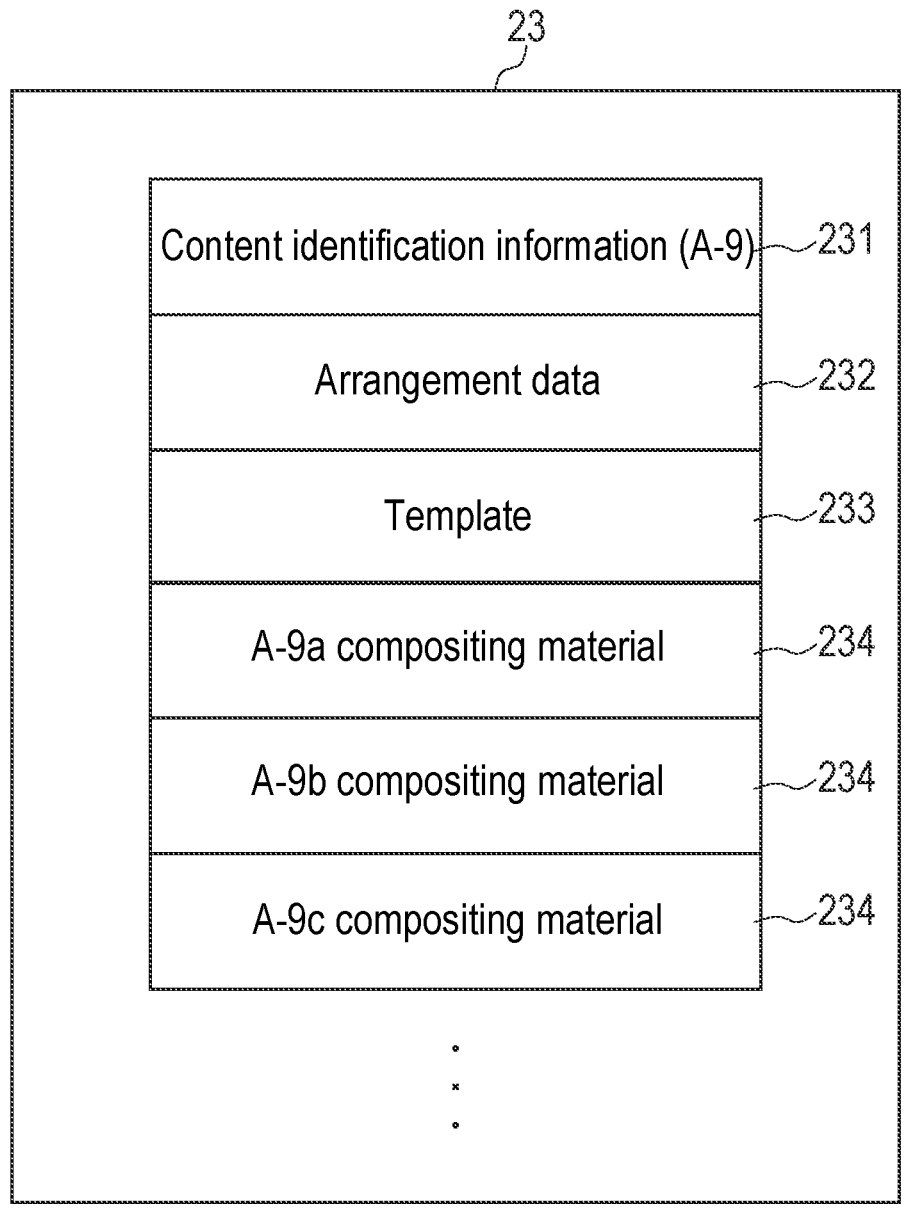
FIG. 4 shows an example of a data configuration of content data.

Return to FIG. 2. The content data 23 is data of content to be delivered. FIG. 4 shows an example of a data configuration of the content data 23. The content data 23 has content identification information 231, arrangement data 232, a template 233, compositing materials 234 for each piece of playback content A-9a to A-9c, and the like.

The content identification information 231 is an identifier given to each of a plurality of pieces of content in order to make them distinguishable from one another. A symbol "A-9" noted in brackets is shown as an example, and this content identification information 231 identifies the ninth piece of content of the series "anime A." The arrangement data 232 is for determining which playback content to choose depending on Viewed flags.

FIG. 5A shows an example of the arrangement data 232. The arrangement data 232 presents video variation patterns and conditions for them. An example of a video variation pattern is a variation of content which is basic content modified with the identity of the content being maintained. Pieces of playback content "A-9a," "A-9b," "A-9c," "A-9d," . . . are associated with the content "A-9." When a user has chosen a display image corresponding to the content "A-9," that is, when a user has tried to view episode 9 of "anime A," one of the pieces of playback content "A-9a," "A-9b," "A-9c," "A-9d," . . . is played based on Viewed flags described later. In the example shown in FIG. 5A, conditions for the pieces of playback content "A-9a," "A-9b," "A-9c," and "A-9d" to be chosen are associated with the number of Viewed flags. The playback content "A-9a" is associated with a condition that there is no Viewed flag, the playback content "A-9b" is associated with a condition that there is one Viewed flag, the playback content "A-9c" is associated with a condition that there are two Viewed flags, and the playback content "A-9d" is associated with a condition that there are three or more Viewed flags.

FIG. 5B shows another example of the arrangement data 232. In the example shown in FIG. 5B, pieces of playback content "A-4a," "A-4b," . . . are associated with content "A-4." In the example shown in FIG. 5B, conditions for the pieces of playback content "A-4a" and "A-4b" to be chosen are associated with a Viewed flag for the content "A-3." The playback content "A-4a" is associated with a condition that there is no Viewed flag for the content "A-3," and the playback content "A-4b" is associated with a condition that there is a Viewed flag for the content "A-3."

While FIG. 5A gives an example in which playback content is associated with the number of Viewed flags and FIG. 5B gives an example in which playback content is associated with the presence or absence of a Viewed flag relating to a specified episode, the arrangement data 232 may associate playback content with both of the number of Viewed flags and the presence or absence of a Viewed flag relating to a specified episode.

Return to FIG. 4. The template 233 of the content data 23 is a form of content identified by the content identification information. The template 233 is a part that is included in every playback content corresponding to the content identification information and does not change depending on a viewing history or the like. The template 233 is, for example, the background of content.

The compositing materials 234 are materials to be composited to the template 233 depending on the kind of playback content. A compositing material is a component of playback content, and may be any of an image, a video, and a sound. "A-9a compositing material," "A-9b compositing material," and "A-9c compositing material" are materials for generating pieces of playback content "A-9a," "A-9b," and "A-9c," respectively.

As described above, playback content is stored in the memory 20 in the form of the template 233 and the multiple kinds of compositing materials 234 in the embodiment. Playback content is generated by compositing the compositing material 234 to the template 233 according to a condition specified by the arrangement data 232.

Next, a description will be made of the selection screen generation unit 12, the content determination unit 13, and the flag setting unit 14 realized by executing the server-side program 21. The selection screen generation unit 12 has a function to generate a screen that allows a user to choose content. A selection screen contains display images relating to content identification information.

Figure 6:
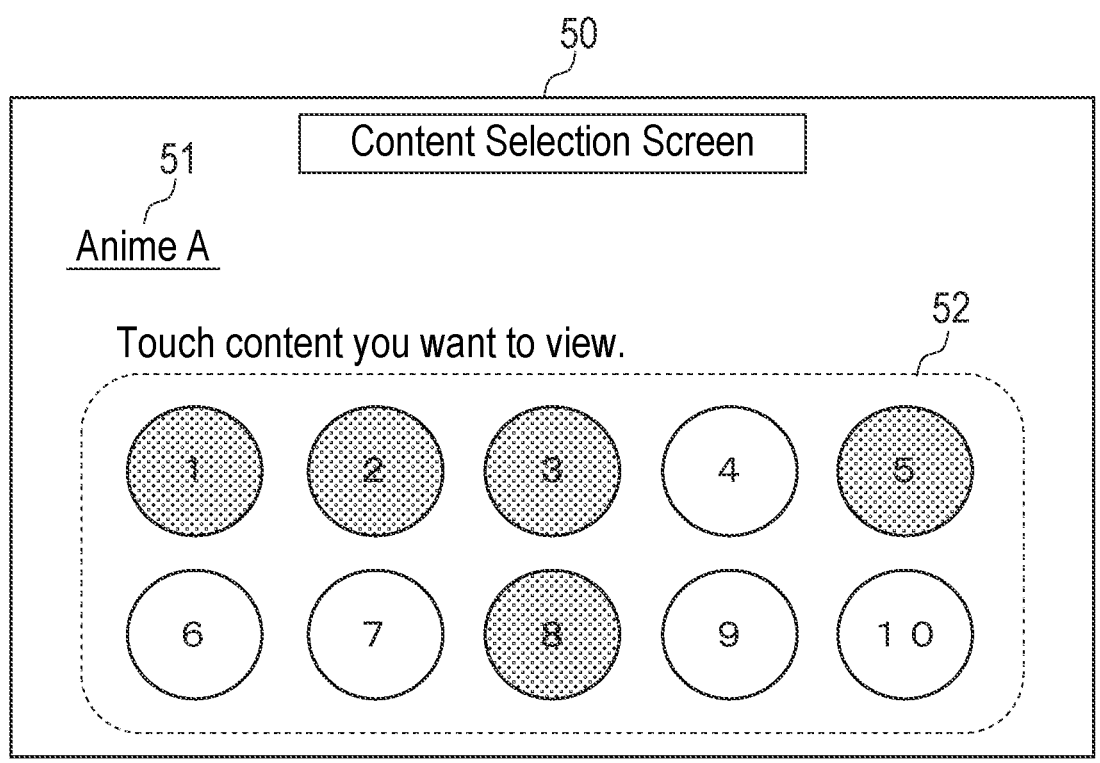
FIG. 6 shows an example of a selection screen.

FIG. 6 shows an example of a selection screen 50. FIG. 6 shows as an example a screen on which content is to be chosen from ten pieces of content, episode 1 to episode 10, of anime A. The selection screen 50 displays a title 51 that indicates what the content is about, and buttons 52 that are display images relating to content identification information. Numbers in the round buttons 52 specify the episode numbers of anime A, and thus allow content to be identified. While in the example shown in FIG. 6 the buttons 52 including numbers are provided for content identification, display images relating to content identification information are not limited to them, but are only required to be images that allow content to be identified. For example, thumbnail images each cut out from a scene in content may be used, or episode titles may be displayed in list form.

On the selection screen 50 shown in FIG. 6, a user touches one of the round buttons 52, causing the choice of content to be accepted. In FIG. 6, buttons "1," "2," "3," "5," and "8" of the buttons 52 are colored in gray, which indicates that these pieces of content have been already viewed. Based on data on Viewed flags stored in the user data 22, the selection screen generation unit 12 identifies viewed pieces of content associated with the user identification information, and generates buttons 52 in gray. In contrast, it generates buttons 52 in white for pieces of content identification information corresponding to pieces of content that have not been viewed. Changing the color of the buttons in this way allows the user to easily recognize pieces of content that have been viewed and those that have not. The server apparatus 10 sends data of the generated selection screen 50 to the user terminal 30.

The content determination unit 13 has a function to receive information on the choice of content sent from the user terminal 30 and determine playback content for content of the received choice information. The content determination unit 13 determines playback content in such a way that the playback content varies in detail depending on the number and kinds of Viewed flags associated with the user identification information, and generates the playback content.

Specifically, the content determination unit 13 reads the Viewed flags 222 associated with the user identification information 221 for a content delivery destination from the user data 22 stored in the memory 20. The content determination unit 13 then reads the arrangement data 232 associated with the content identification information 231 of the content chosen by the user, and chooses playback content by checking the Viewed flags 222 against the conditions of the arrangement data 232.

To illustrate with the example shown in FIG. 5A, when the content identification information "A-9" has been chosen, the content determination unit 13 determines to generate: the playback content "A-9a" if there is no Viewed flag; the playback content "A-9b" if there is one Viewed flag; the playback content "A-9c" if there are two Viewed flags; and the playback content "A-9d" if there are three or more Viewed flags.

The content determination unit 13 then reads the compositing material 234 for the identified playback content, and generates the playback content by compositing the compositing material 234 to the template 233. With the above process, the content determination unit 13 generates playback content based on the user's viewing history. The server apparatus 10 sends data of the generated playback content to the user terminal 30.

The flag setting unit 14 has a function to associate a Viewed flag for content played on the user terminal 30 with user identification information. The server apparatus 10 receives data indicating that the playback content it sent to the user terminal 30 has been played on the user terminal 30 from the user terminal 30. Upon receiving the data indicating that the content has been played, the flag setting unit 14 associates the Viewed flag for the content with the user identification information and stores it in the memory 20.

Configuration of User Terminal 30

Next, the user terminal 30 will be described. As shown in FIG. 1, the user terminal 30 has a processor 31, a memory 40, a communications unit 35, an input unit 36, and an output unit 37. The processor 31 reads and executes a program stored in the memory 40, and thereby realizes the functions of a presentation unit 32, an acquisition unit 33, and a playback unit 34. The hardware of the user terminal 30 is not limited and may be a TV, a tablet terminal, a smartphone, a personal computer, a game apparatus, or the like. The user terminal 30 is assumed to be a tablet terminal here, and the input unit 36 and the output unit 37 are made up of a touch-panel display.

Figure 7:
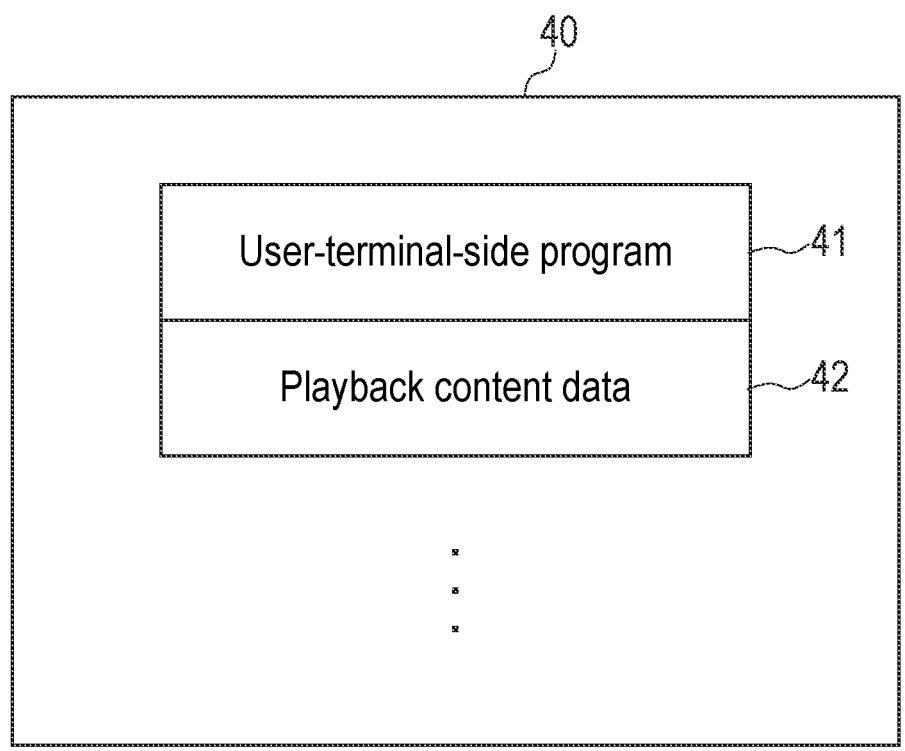
FIG. 7 is a memory map showing an example of various data stored in a memory of a user terminal.

FIG. 7 is a memory map showing an example of data stored in the memory 40 of the user terminal 30. A user-terminal-side program 41, playback content data 42, and the like are stored in the memory 40 of the user terminal 30.

The user-terminal-side program 41 is a program on the side of the user terminal 30 for carrying out content delivery in the embodiment. The program includes codes for performing the choice of content, the playback of delivered content, a process of communicating with the server apparatus 10, and the like. The playback content data 42 is playback content data delivered from the server apparatus 10.

A description will be made of the presentation unit 32, the acquisition unit 33, and the playback unit 34 realized by executing the user-terminal-side program 41. The presentation unit 32 receives data of a selection screen from the server apparatus 10, and displays the received selection screen on the touch-panel display, which is the output unit 37 of the user terminal 30.

The acquisition unit 33 acquires information on the choice of content identification information via the selection screen displayed on the touch-panel display. In the example shown in FIG. 6, when a user touches one of the buttons 52, the acquisition unit 33 acquires content identification information corresponding to the touched button 52. The acquisition unit 33 sends the acquired content identification information to the server apparatus 10 as content choice information.

The playback unit 34 plays and displays playback content delivered from the server apparatus 10 on the touch-panel display of the user terminal 30. In addition, when the playback content starts to be played, the playback unit 34 sends information indicating that the playback has been started to the server apparatus 10. This allows the server apparatus 10 to recognize the playback content's having been viewed.

Description of Operation

Figure 8:
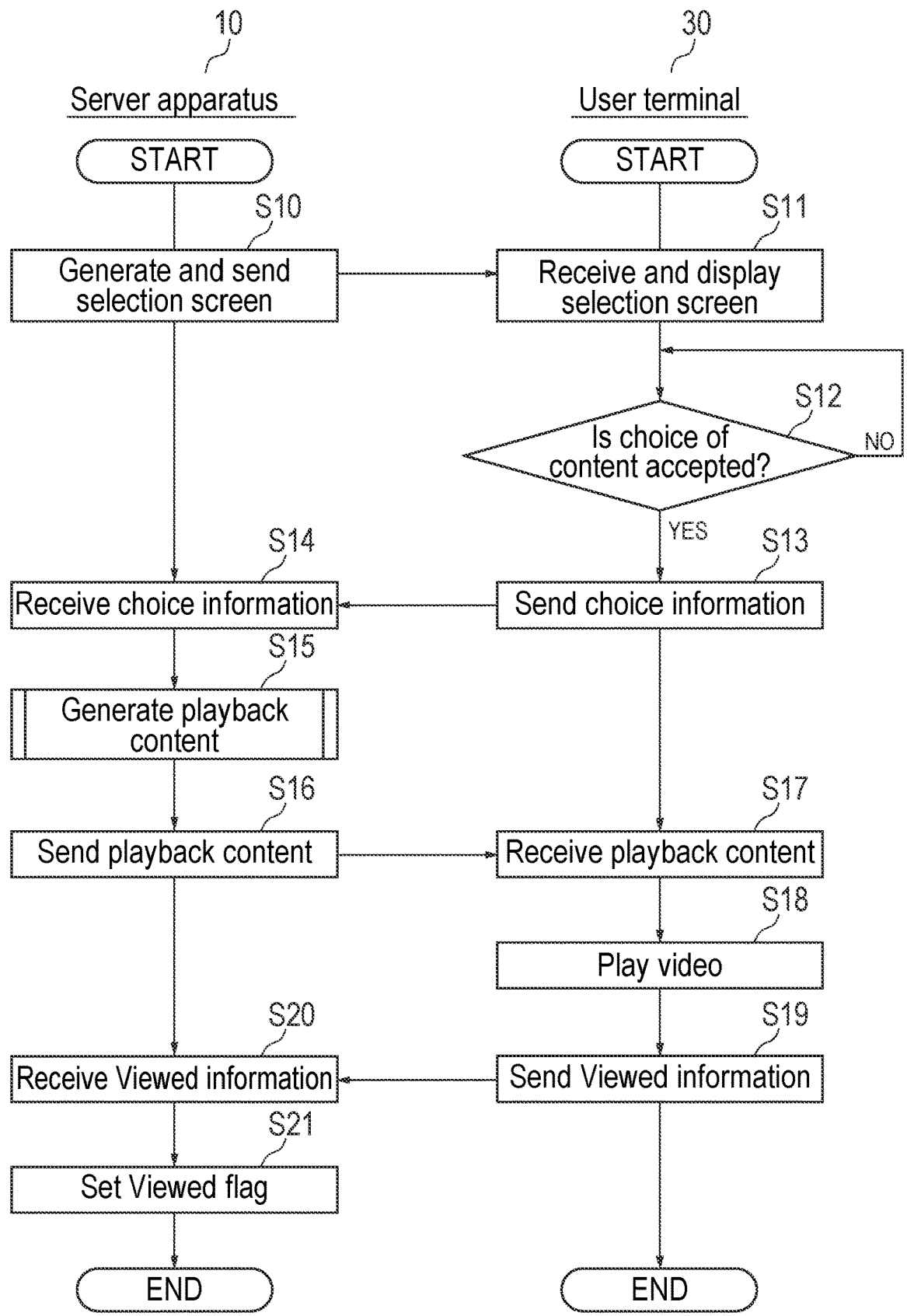
FIG. 8 is a flowchart showing an operation of the information processing system of the embodiment.

FIG. 8 is a flowchart showing an operation of the information processing system 1 of the embodiment. The server apparatus 10 generates the selection screen 50 for the choice of content to be delivered, and sends data of the generated selection screen 50 to the user terminal 30 (S10). The selection screen 50 here, based on Viewed flags associated with user identification information, presents display images relating to content identification information in such a way that viewed content can be distinguished (see FIG. 6).

The user terminal 30 receives the data of the selection screen 50, and displays the selection screen 50 on the display of the user terminal 30 (S11). If a user touches one of the buttons 52, which indicate content identification information, on the selection screen 50, the user terminal 30 accepts the choice of content. If no content is chosen (NO at S12), the user terminal 30 waits until the choice of content is input.

Upon accepting the choice of content (YES at S12), the user terminal 30 sends the content choice information indicating which content the user has chosen to the server apparatus 10 (S13). The server apparatus 10 receives the choice information (S14), and generates playback content for the received content (S15). The process of generating playback content will be described later with reference to FIG. 9.

The server apparatus 10 sends the generated playback content to the user terminal 30 (S16). The user terminal 30 receives the playback content (S17), and performs a process of playing a video of the received playback content (S18). The user terminal 30 may start to play the video immediately after it receives the playback content, or may start to play after the user's instruction to start.

When starting to play the video, the user terminal 30 sends Viewed information to the server apparatus 10 (S19). While the embodiment provides an example in which starting to play a video will count as having viewed the content, the criterion to determine the content's having been viewed may be set otherwise as described later.

The server apparatus 10 receives the Viewed information from the user terminal 30 (S20), and based on the received Viewed information, sets a Viewed flag for the content, associating it with the user's user identification information (S21).

Figure 9:
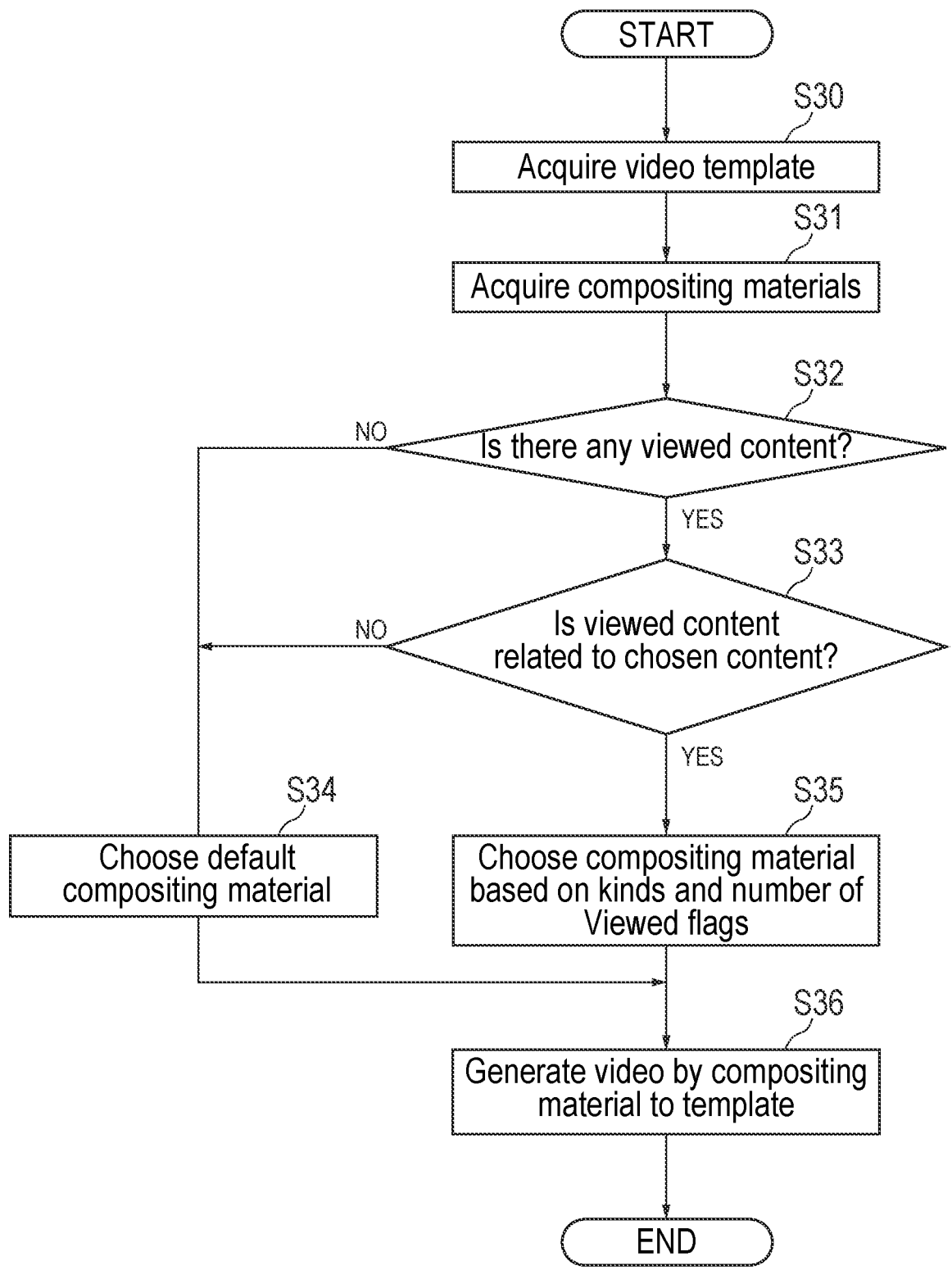
FIG. 9 is a flowchart detailing a process of generating playback content.

FIG. 9 is a flowchart detailing the process of generating playback content (S15). The server apparatus 10 first acquires the template 233 from the content data 23 stored in the memory 20 (S30), and then acquires the compositing materials 234 (S31).

The server apparatus 10 acquires data on the Viewed flags 222 associated with a content delivery destination user's user identification information from the user data 22, and determines whether there is any viewed content associated with the user identification information or not (S32). If there is no viewed content (NO at S32), the server apparatus 10 chooses a default compositing material 234 (S34).

If there is any viewed content (YES at S32), the server apparatus 10 determines whether the content chosen by the user is related to the viewed content or not (S33). For example, if the content chosen by the user is episode 9 of anime A and the viewed content is episode 7 of anime A, the chosen content is determined to be related to the viewed content. If the viewed content relates to anime B, the chosen content is determined to have no relation to the viewed content.

If this determination indicates that the chosen content is not related to the viewed content (NO at S33), the server apparatus 10 chooses the default compositing material 234 (S34). If the chosen content is related to the viewed content (YES at S33), the server apparatus 10 chooses the compositing material 234 based on the number and kinds of the Viewed flags (S35). The server apparatus 10 generates a video for the playback content by compositing the chosen compositing material 234 to the template 233 (S36).

The above is a description of a configuration and an operation of the information processing system 1 of the embodiment. The information processing system 1 of the embodiment generates and delivers playback content based on a user's viewing history (the number and kinds of pieces of viewed content), and therefore can provide appropriate content no matter which related content the user starts viewing from.

Recently, there are many video websites, and the amount of content being offered to users is exploding. Anime, dramas, and the like with self-contained episodes continue to be increasingly viewed without watching all the episodes or out of order. Recommendation features of video websites display popular episodes as related videos, and thus encourage these tendencies. In such cases, for example, something like "A character A who is supposed to have become a teammate in episode 5 is not in the team when episode 4 is viewed afterward" or "Seven treasures were owned in episode 8, but the number of treasures owned decreases to two when episode 3 is viewed afterward" might happen. Such mismatches would make users view the content thinking simply that the content is premade and that they are simply peering into it, hindering their immersion in the content.

The information processing system of the embodiment generates and delivers playback content according to a user's viewing history, and can thereby enhance a sense of unity of user experience and content. Consequently, even when a user has not viewed a series of video works in order from episode 1 (has viewed them in order of the user's preference), the story changes according to the user's viewing history and thereby enhances the user's sense of immersion, making the video works more enjoyable as a story that aligns with the user's own experience.

Playback Content Based on Viewing History

Now, an example of different kinds of playback content generated based on a viewing history will be described. Assume that content is an adventure story with self-contained episodes. A main character of the story discovers one treasure in each episode. Accordingly, the main character will get as many treasures as the number of episodes a user has viewed. In the case of such content, pieces of content different from one another can be generated based on a viewing history by adding narration such as "(The number of viewed episodes) treasures have been obtained so far. The remaining number is _____." according to the number of viewed episodes (i.e., the number of Viewed flags). More specifically, if a user has already viewed three episodes of a 10-episode anime series, the narration will be "Three treasures have been obtained so far. The remaining number is seven." and if the user has viewed six episodes, the narration will be "Six treasures have been obtained so far. The remaining number is four."

This allows the content to match the number of viewed episodes. Moreover, the user is allowed to confirm, during viewing, how many episodes of the content the user has already viewed. Furthermore, the user is allowed to have a feeling that the content is customized for the user. In the embodiment, every content is subject to arrangement, and can become a viewing history that affects the arrangement of other pieces of content. Therefore, the above arrangement can be made regardless of the order in which the user views the content.

Figure 10:
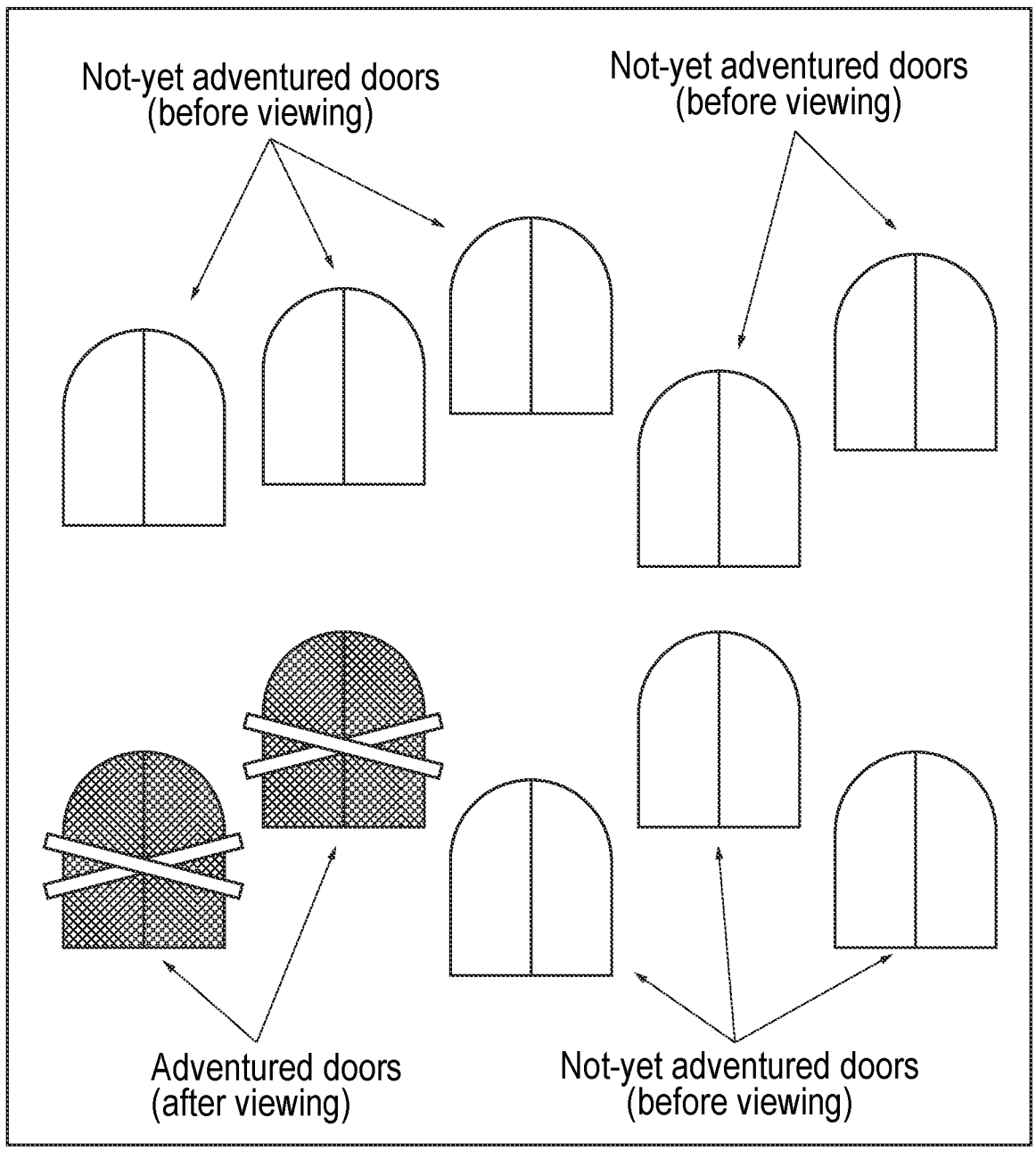
FIG. 10 shows an example of images in playback content being changed.
Figure 11:
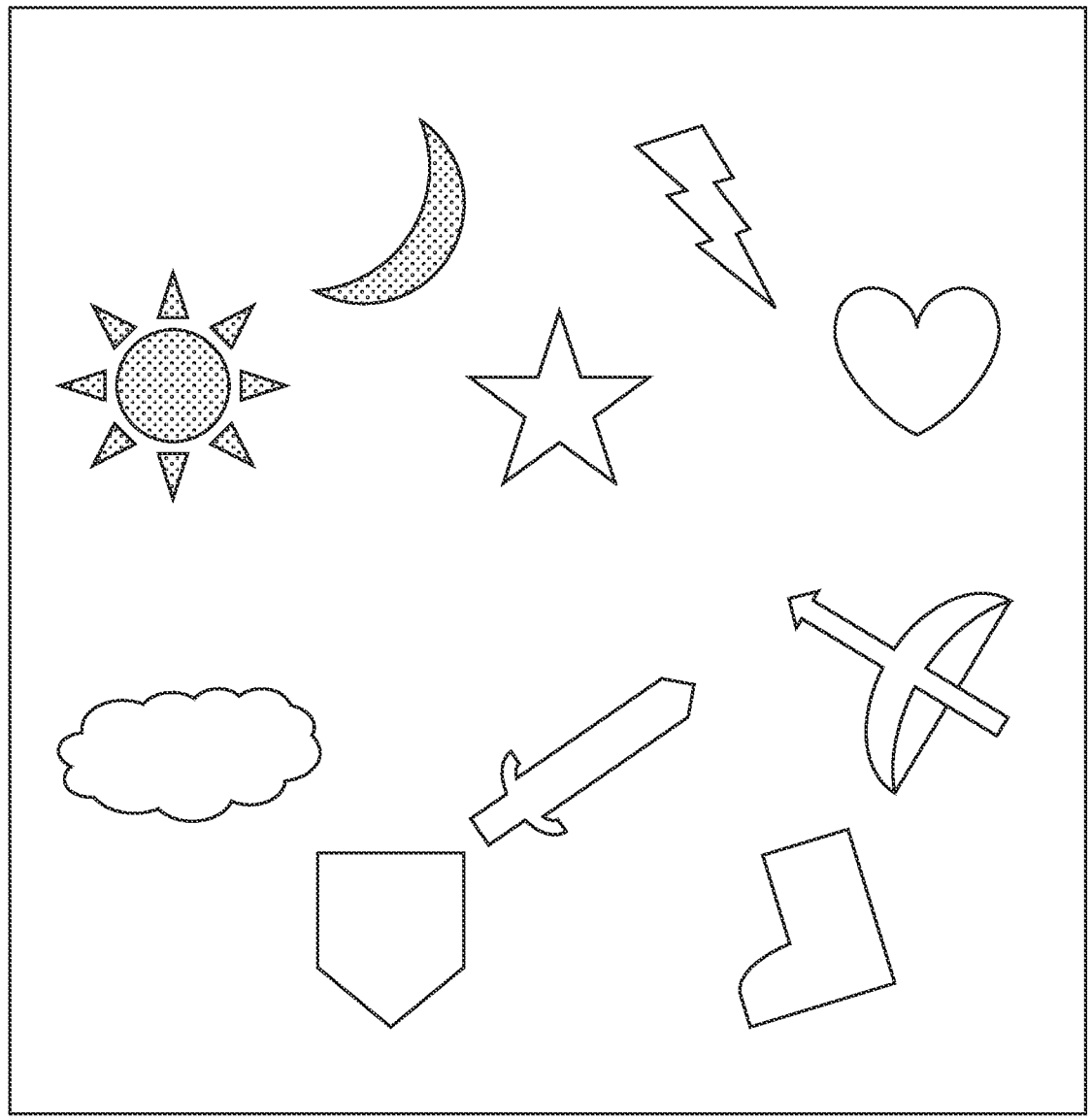
FIG. 11 shows an example of images in playback content being changed.
Figure 12:
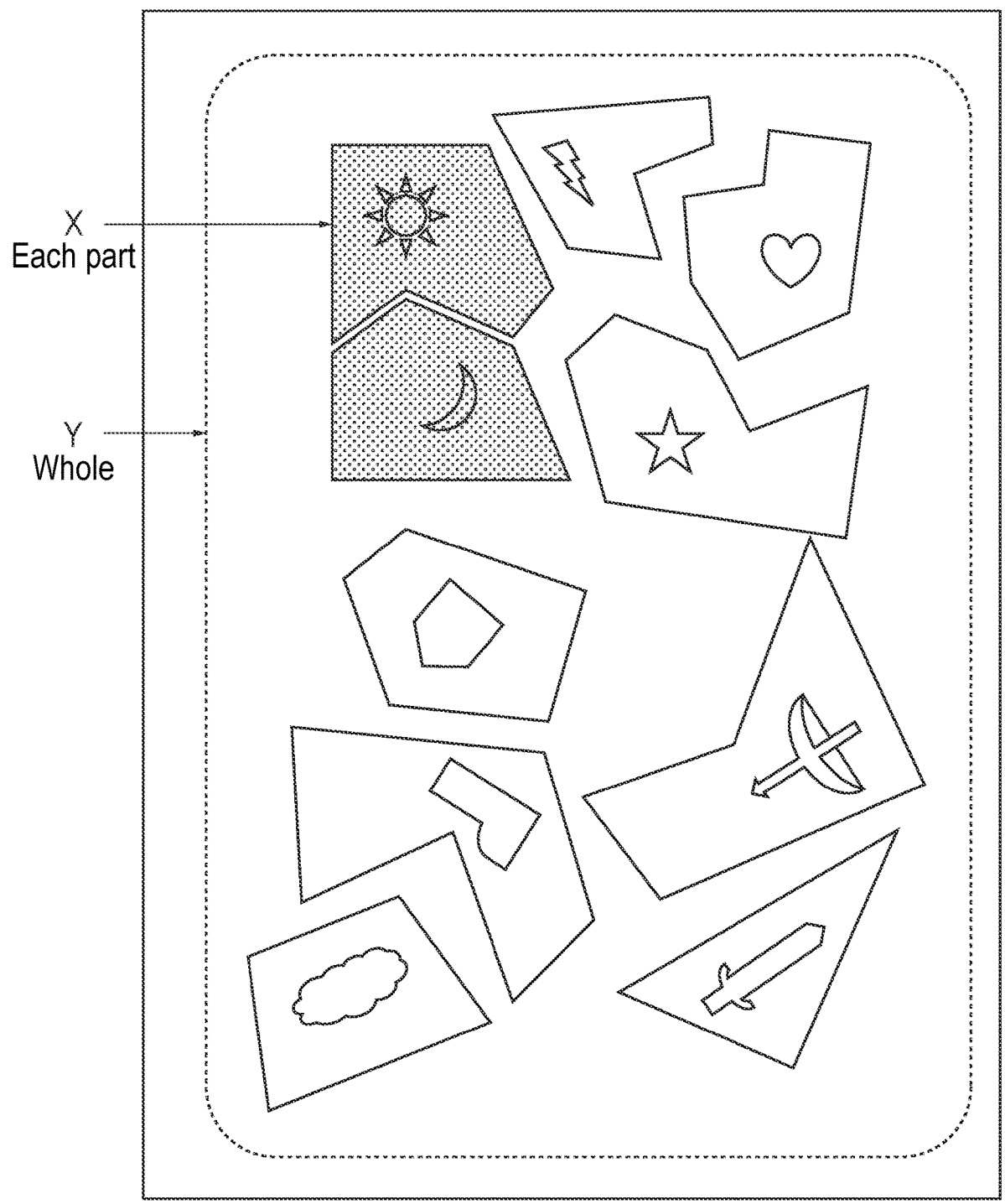
FIG. 12 shows an example of images in playback content being changed.

While an example in which narration is added has been cited above, an image in playback content may be changed instead of or besides the addition of narration. FIGS. 10 to 12 show examples of images in playback content being changed based on Viewed flags. The image shown in FIG. 10 is an example in which images of adventured doors are composited with images of not-yet-adventured doors based on data of pieces of content related to Viewed flags. Two out of ten doors in total are shut in the example shown in FIG. 10. That is, this example represents a case where two out of ten episodes in total have been viewed.

FIG. 11 shows images indicating the kinds of treasures, where acquired treasures are displayed in color. The example shown in FIG. 11 indicates that Sun Treasure and Moon Treasure have been already acquired. FIG. 12 shows pieces each representing a treasure, where the pieces make up a jigsaw puzzle and the puzzle nears completion as treasures are acquired.

The information processing system 1 may change the scenario of content based on a user's viewing history. For example, it may change a scenario in such a way that a happy ending comes if ten or more treasures have been acquired and a bad ending comes if nine or less treasures have been acquired. The scenario is not limited to the two kinds of happy and bad endings, and may be chosen from a plurality of prepared scenarios depending on the number of viewed episodes.

There may be another example in which playback content is changed depending on whether a specified piece of content has been viewed or not, such as the following. For example, there may be a case where if a specified content, episode 7, has been viewed, a new fellow character A is added when another piece of content is viewed, and if the specified content has not been viewed, the fellow character A is not added to another piece of content.

An item object may be changed instead of a character. For example, there may be a case where if a main character acquires a hat in a certain piece of content, the main character wears the hat also when another piece of content is viewed if the certain piece of content has already been viewed, and the hat does not exist in another piece of content if the certain piece of content has not been viewed yet. While a hat has been taken here as an example of an item object, an item object is not limited to a hat, but may be, for example, a costume and a prop.

As described above, there may be various modes for the method of changing the details of content based on a viewing history. The examples described above do not limit the method of changing the details of content.

While the information processing system of the disclosure has been described in detail above with the embodiment, the information processing system of the disclosure is not limited to the above-described embodiment. Variations of the embodiment will be described below.

Method of Generating Playback Content

While the above-described embodiment provides an example in which playback content is generated by compositing a template with a compositing material, the method of generating playback content is not limited to the one described above.

Figure 13:
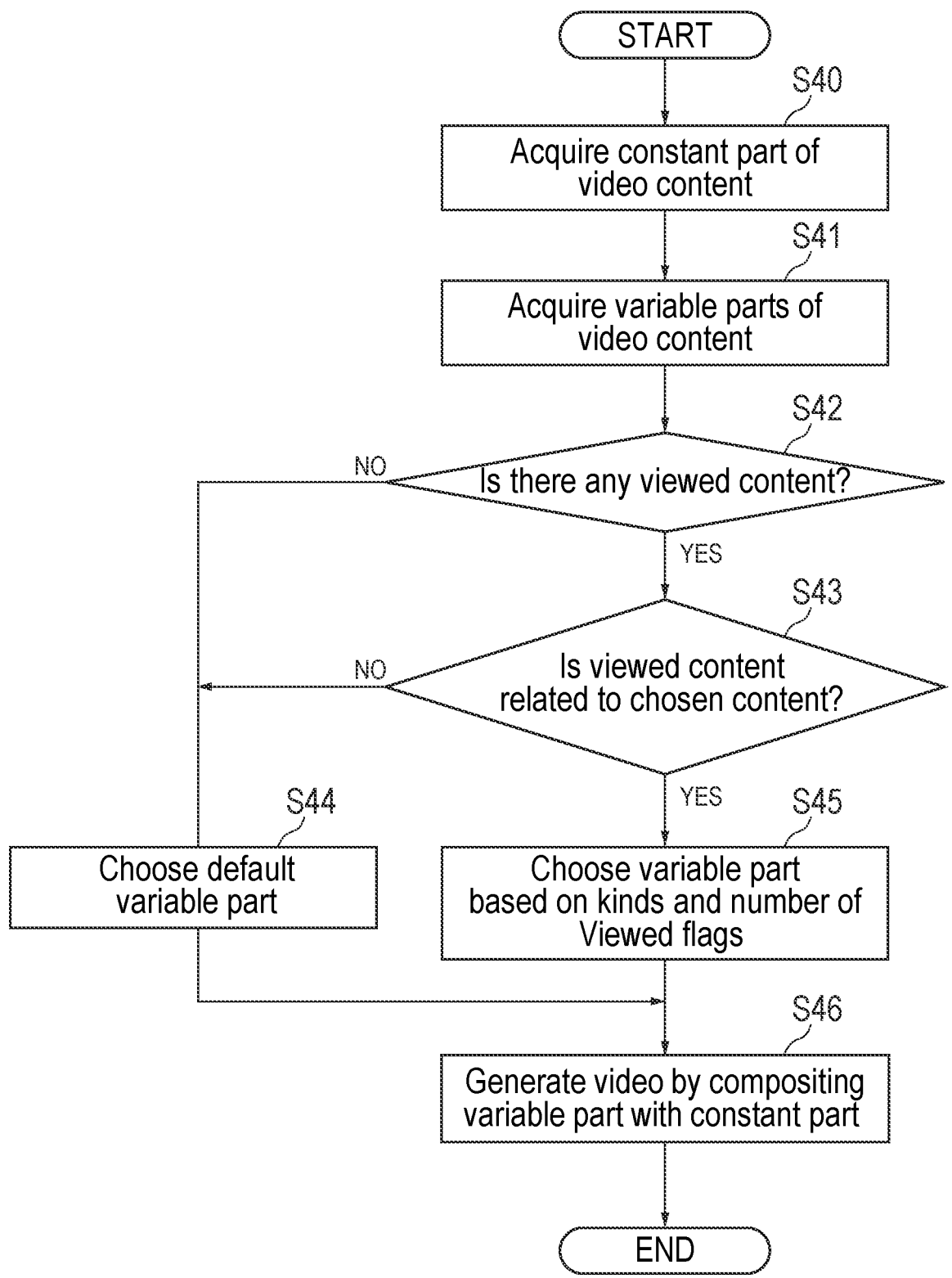
FIG. 13 is a flowchart showing another example of the video generation process.

FIG. 13 is a flowchart showing another example of the video generation process. In the process shown in FIG. 13, video content is set to comprise a constant part and a variable part, and video content is generated by combining a variable part of video content chosen depending on Viewed flags with a constant part of video content.

A constant part of video content is a part that does not change depending on Viewed flags. For example, it may be an actual adventure scene. In contrast to this, a variable part of video content is a part that changes depending on Viewed flags. For example, it is a part of video content such as the beginning, ending, or the like of a video, the part being prepared with details that vary for each playback content. For example, a departure scene for a predetermined time at the beginning of video content may be made variable. This enables the departure scene to change according to Viewed flags. More specifically, in an example scene where "when a main character is going on an adventure from the character's lodging, characters who have already become teammates cheer for the main character," there may be an example in which the number or kinds of the characters who cheer for the main character change depending on Viewed flags.

The server apparatus 10 acquires a constant part of video content (S40), and then acquires variable parts of video content (S41). The server apparatus 10 acquires data on the Viewed flags 222 associated with a content delivery destination user's user identification information from the user data 22, and determines whether there is any viewed content associated with the user identification information or not (S42). If there is no viewed content (NO at S42), the server apparatus 10 chooses a default variable part (S44).

If there is any viewed content (YES at S42), the server apparatus 10 determines whether the content chosen by the user is related to the viewed content or not (S43). If this determination indicates that the chosen content is not related to the viewed content (NO at S43), the server apparatus 10 chooses the default variable part (S44). If the chosen content is related to the viewed content (YES at S43), the server apparatus 10 chooses a variable part of video content based on the kinds and number of the Viewed flags (S45). The server apparatus 10 generates a video for the playback content by compositing the chosen variable part of video content with the constant part of video content (S46).

Figure 14:
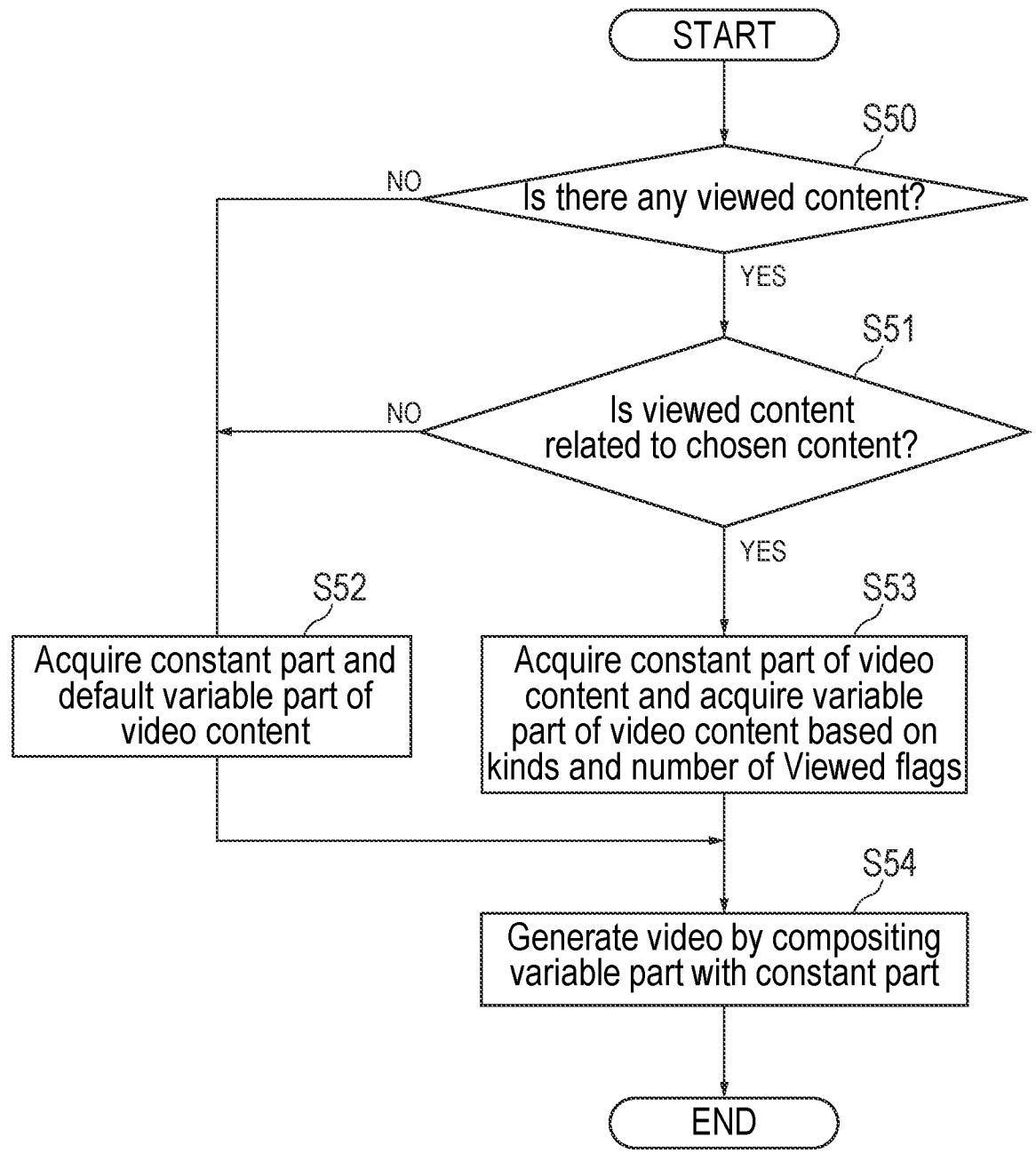
FIG. 14 is a flowchart showing another example of the video generation process.

While FIG. 13 gives an example in which the acquirement of a constant part of video content (S40) and the acquirement of variable parts (S41) are performed first, the acquirement of these pieces of data may be performed after the determination on Viewed flags. FIG. 14 is a flowchart showing another example of the video generation process.

The server apparatus 10 acquires data on the Viewed flags 222 associated with a content delivery destination user's user identification information from the user data 22, and determines whether there is any viewed content associated with the user identification information or not (S50). If there is no viewed content (NO at S50), the server apparatus 10 acquires a constant part of video content and a default variable part (S52).

If there is any viewed content (YES at S50), the server apparatus 10 determines whether the content chosen by the user is related to the viewed content or not (S51). If this determination indicates that the chosen content is not related to the viewed content (NO at S51), the server apparatus 10 chooses the constant part of video content and the default variable part (S52). If the chosen content is related to the viewed content (YES at S51), the server apparatus 10 acquires the constant part of video content and acquires a variable part of video content based on the kinds and number of the Viewed flags (S53). The server apparatus 10 generates a video for the playback content by compositing the chosen variable part of video content with the constant part of video content (S54).

The compositing of a template and a compositing material and the compositing of a variable part and a constant part described in the embodiment are performed when content is delivered, but there may be a configuration where a plurality of pieces of playback content are all prepared in advance and one of them is chosen for delivery. Sometimes it is better to prepare all pieces of playback content in advance if the scenario of content itself is significantly varied, such as changing the ending to either a happy or bad ending depending on Viewed flags.

The server apparatus 10 may also send data required to render playback content to the user terminal, and may draw details to be played in real time on the user terminal 30. More specifically, the user terminal 30 may perform a control in which it reads the template 233 and compositing materials 234 stored in advance in a storage (not shown) into the memory 40, combines them as appropriate depending on Viewed flags, and dynamically generates a video when it is displayed on the user terminal 30. The scene may then be captured with a virtual camera, and the output unit 37 may be caused to display the captured image.

Determination on Whether Content has Been Viewed

While the above-described embodiment provides an example in which content is determined as viewed when its playback content starts to be played and then a Viewed flag is sent from the user terminal to the server apparatus, the timing of determining that content has been viewed is not limited to when playback is started.

For example, playback content may be determined to have been viewed when it has been played to the end or when it has been played up to a predetermined point. The predetermined point may be determined, for example, uniformly by the length or percentage of playback completion such as the first three minutes, 50% of the whole content, or individually for each content depending on the details of the content such as up to a scene where a predetermined character appears.

Flag Setting and Arrangement Data

While the above-described embodiment provides an example of arrangement data for choosing playback content depending on the number and kinds of Viewed flags, time elapsed from when a Viewed flag is associated and the number of views may also be used as conditions for choosing playback content.

To use elapsed time, data on date and time when a Viewed flag is associated is stored in the user data. The content determination unit determines time elapsed from when a Viewed flag is associated to when content choice information is received, and determines playback content depending on the elapsed time. As an example of using data on elapsed time, playback content may be varied in such a way that a thief can be caught if episode 6 is viewed within a week after episode 5 is viewed, but makes off if episode 6 is viewed after a week or more have elapsed.

To use the number of views, a Viewed flag and data on the number of views are stored together in the user data. The content determination unit determines playback content based on the Viewed flag and the number of views. As an example of using data on the number of views, a main character's ability may be changed in another piece of content when an episode where the main character trains has been viewed only once compared to when it has been viewed twice or more. As another example, a scenario may be changed in such a way that a treasure won't be found if a piece of content where treasure hunting is performed has been viewed only once, but it will be found if the content has been viewed twice or more.

About Selection Screen

While the above-described embodiment provides an example of a selection screen on which pieces of content of episodes 1 to 10 can be chosen, the selection screen may offer different content options depending on Viewed flags.

Figure 15:
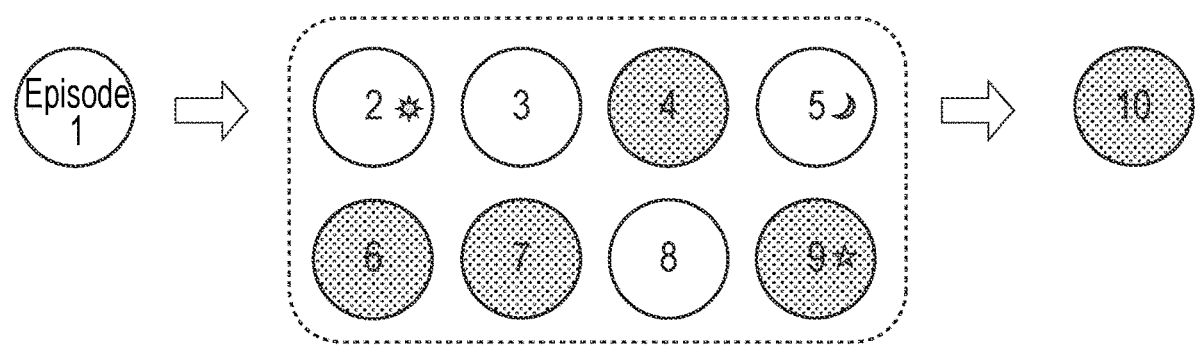
FIG. 15 illustrates a selection screen that changes based on a viewing history.

FIG. 15 illustrates a selection screen that changes based on a viewing history. If there is no Viewed flag, the selection screen displays episode 1 only (the left side of FIG. 15), allowing only episode 1 to be chosen. If there is a Viewed flag for episode 1, the selection screen displays episodes 2 to 9 (the center of FIG. 15), allowing episodes 2 to 9 to be chosen. If there are a predetermined number of Viewed flags or more or if there is a specified Viewed flag, the selection screen displays episode 10 (the right side of FIG. 15), allowing episode 10 to be chosen.

Note that even if episode 10 has versions A and B of playback content that are chosen depending on Viewed flags (e.g., pieces of playback content with different endings), the selection screen for episode 10 just displays "episode 10," and the user does not recognize the versions A and B. Which of versions A and B of playback content to deliver when episode 10 is chosen is determined depending on the number or kinds of Viewed flags, which is the same as the above-described embodiment.

Additionally, when Viewed flags satisfy a predetermined condition and either version A or B is chosen, the version not chosen cannot be viewed regularly, but a predetermined operation or a bonus offering may allow for viewing it.

We claim:

1. An information processing system comprising:
a processor and a memory coupled thereto, the processor being configured to control the information processing system to perform operations comprising:
presenting display images relating to a plurality of kinds of content identification information to a user;
acquiring content identification information associated with a display image selected by the user from among the display images presented to the user;
based on selection of the display image by the user, determining which one of multiple possible variations of a playback content that corresponds to the acquired content identification information to present to the user, wherein the multiple possible variations include a first variation of the playback content and a second variation of the playback content, wherein determination of which one of the multiple possible variations to present is based on a Viewed flag that is associated with the playback content;
based on presentation of the at least one of the multiple possible variations of the playback content, updating or setting the Viewed flag to indicate that the playback content has been played with the user's identification information;
based on determination that the first variation of the playback content is to be presented, presenting the first variation of the playback content to the user; and
based on determination that the second variation of the playback content is to be presented, presenting the second variation of the playback content to the user, wherein the second variation of the playback content is modified to be different from the first variation of the playback content based on a difference in the Viewed flag that is associated with the playback content.

2. The information processing system according to claim 1, wherein the operations further comprise:
generating a combination that is based on a template of the playback content and a compositing material, wherein the second variation is based on the combination.

3. The information processing system according to claim 2, wherein the compositing material includes at least one of a sound, a moving image, and an image.

4. The information processing system according to claim 1, wherein the second variation of the playback content is modified depending on at least the Viewed flag associated with the user's identification information.

5. The information processing system according to claim 1, wherein the second variation of the playback content is modified by dynamically generating details in real time that are included in the second variation.

6. The information processing system according to claim 1, wherein determination of which one of multiple possible variations to present includes selecting from among candidates for the playback content depending on at least the Viewed flag associated with the user's identification information.

7. The information processing system according to claim 1, wherein the second variation of the playback content is modified based on a number of number of Viewed flag(s) associated with the user's identification information.

8. The information processing system according to claim 1, wherein the second variation of the playback content is modified including the playback content varies in detail based on at least whether the Viewed flag indicating that the playback content associated with the content identification information that is predetermined and specified has been played is associated with the user's identification information or not.

9. The information processing system according to claim 1, wherein the second variation of the playback content is modified including a character appearing in the playback content is changed based the Viewed flag.

10. The information processing system according to claim 1, wherein the second variation of the playback content is modified including an item object appearing in the playback content is changed based on the Viewed flag.

11. The information processing system according to claim 1, wherein the second variation of the playback content is modified including a scenario varies depending on at least the Viewed flag associated with the user's identification information.

12. The information processing system according to claim 1, wherein updating or setting the Viewed flag to indicate that the playback content has been played with the user's identification information is performed in response to the playback content having started to be played.

13. The information processing system according to claim 1, updating or setting the Viewed flag to indicate that the playback content has been played with the user's identification information is performed based on satisfaction of a playback condition that corresponds to satisfying the playback content being played to a prescribed point.

14. The information processing system according to claim 13, wherein the playback condition is that the playback content has been played up to the playback content's 50% point.

15. The information processing system according to claim 13, wherein the playback condition is that the playback content has been played up to the playback content's end point.

16. The information processing system according to claim 1, wherein the operations further comprise calculating an elapsed time from when the Viewed flag associated with the user's identification information is associated to when the content identification information is acquired,
wherein determining the playback content is based on the calculated elapsed time.

17. The information processing system according to claim 1, wherein the operations further comprise;
counting up the number of playbacks of the content identification content and associating the count with the user's identification information.

18. An information processing apparatus comprising:
a processor and a memory coupled thereto, the processor being configured to control the information processing system to perform operations comprising:
sending data of display images relating to a plurality of kinds of content identification information to a user's user terminal;
receiving content identification information associated with a display image chosen by the user from the user terminal;
based on which display image has been chosen by the user, determining which one of multiple possible variations of a playback content that corresponds to the received content identification information to provide to the user for viewing, wherein the multiple possible variations include a first variation of the playback content and a second variation of the playback content, wherein determination of which one of the multiple possible variations to provide is based on a Viewed flag that is associated with the playback content;
based on the at least one of the multiple possible variations of the playback content having been presented, updating or setting the Viewed flag to indicate that the playback content has been played with the user's identification information;
based on determination that the first variation of the playback content is to be presented, presenting the first variation of the playback content to the user; and
based on determination that the second variation of the playback content is to be presented, providing the second variation of the playback content to the user for viewing, wherein the second variation of the playback content is modified to be different from the first variation of the playback content based on a difference in the Viewed flag that is associated with the playback content.

19. A non-transitory storage medium storing computer-executable instructions for use with a computing system that delivers content to a user terminal, the stored instructions comprising instructions that cause the computing system to perform operations comprising:
sending data of display images relating to a plurality of kinds of content identification information to a user's user terminal;
receiving content identification information associated with a display image chosen by the user from the user terminal;
based on which display image has been chosen by the user, determining which one of multiple possible variations of a playback content that corresponds to the received content identification information to provide to the user for viewing, wherein the multiple possible variations include a first variation of the playback content and a second variation of the playback content, wherein determination of which one of the multiple possible variations to provide is based on a Viewed flag that is associated with the playback content,
based on the at least one of the multiple possible variations of the playback content having been presented, updating or setting the Viewed flag to indicate that the playback content has been played with the user's identification information;
based on determination that the first variation of the playback content is to be presented, presenting the first variation of the playback content to the user; and
based on determination that the second variation of the playback content is to be presented, providing the second variation of the playback content to the user for viewing, wherein the second variation of the playback content is modified to be different from the first variation of the playback content based on a difference in the Viewed flag that is associated with the playback content.

20. A method for delivering content from a server apparatus to a user terminal, the method comprising:

sending data for display images relating to a plurality of kinds of content identification information to a user's user terminal;

receiving content identification information associated with a display image chosen by the user from the user terminal;

based on which display image has been chosen by the user, determining which one of multiple possible variations of a playback content that corresponds to the received content identification information to provide to the user for viewing, wherein the multiple possible variations include a first variation of the playback content and a second variation of the playback content, wherein determination of which one of the multiple possible variations to provide is based on a Viewed flag that is associated with the playback content;

based on the at least one of the multiple possible variations of the playback content having been presented, updating or setting the Viewed flag to indicate that the playback content has been played with the user's identification information;

based on determination that the first variation of the playback content is to be presented, sending the first variation of the playback content to the user; and based on determination that the second variation of the playback content is to be presented, sending the second variation of the playback content to the user for viewing, wherein the second variation of the playback content is modified to be different from the first variation of the playback content based on a difference in the Viewed flag that is associated with the playback content.

* * * * *